June 20, 1967 G. HANSEN 3,325,860

MOULDING AND SEALING MACHINES

Filed Oct. 19, 1964

INVENTOR
Gerhard Hansen
By Watson, Cole, Grindle & Watson
Attys.

United States Patent Office 3,325,860
Patented June 20, 1967

3,325,860
MOULDING AND SEALING MACHINES
Gerhard Hansen, Hofener Strasse 47, Offingen,
Kreis, Waiblingen, Germany
Filed Oct. 19, 1964, Ser. No. 404,600
Claims priority, application Germany, Oct. 30, 1963,
H 50,689
6 Claims. (Cl. 18—5)

ABSTRACT OF THE DISCLOSURE

A machine for molding, filling and sealing containers in one operation from a tube of thermoplastic material and having relatively movable mold parts.

Figure 1:
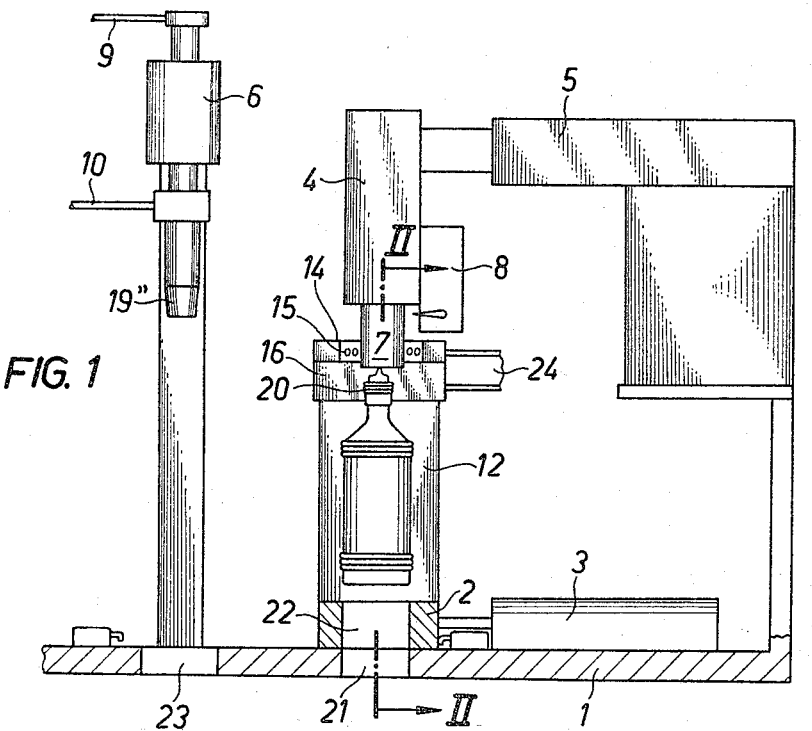

This invention relates to machines for moulding, filling and sealing a container made of thermoplastic material in one operation. The machine has an extrusion head which extrudes thermoplastic tubing a section of which, whilst still hot and plastic, is enclosed in a sectional mould and a fluid under pressure is supplied to within the length of tubing in the mould to expand the tube into contact with the mould surface and form a container. The fluid under pressure may be the material with which the container is to be filled or it may be, for example, a gas which is subsequently displaced from within the container when the material with which the container is to be filled is supplied in this case to the blown container.

A machine has previously been proposed in which the mould remains below the extrusion head and the fluid under pressure is supplied to the container either through the extrusion head or through special ducts in the upper part of the mould. In the first case difficulty arises in providing holding jaws for supporting the length of tubing during the filling operation and special mould sections for sealing the top of the filled container. In the second case fluid supply nozzles are passed through the mould section and protrude into the mould in order to pierce through the length of tubing. With this arrangement there is little space available to accommodate the supply nozzles, which may be hollow needles and which become easily blocked as they pierce through the length of plastic tubing in the mould.

In accordance with the present invention a machine for moulding, filling and sealing containers in one operation comprises an extrusion head for extruding thermoplastic tubing, at least one sectional mould assembly which is arranged to enclose a length of the extruded tubing and the sections of which are each formed with lower and upper parts defining lower and upper moulds for shaping the body and for shaping and sealing the top of the container respectively, and a filling nozzle which is arranged to be introduced into the open upper end of the length of tubing within the mould assembly for supplying fluid under pressure to expand the tubing into contact with the lower mould and form the body of the container, the lower part of each section carrying above the upper part of the same section a suction device for applying suction to the outside of the upper end of the length of tubing within the mould assembly to support the tubing during shaping of the container body but with the tubing out of contact with the upper mould, and the upper part of each section being provided with a further suction device for applying suction to the outside of the tubing for assisting in shaping and sealing the top of the container after the container has been filled through the filling nozzle.

Preferably, the mould assembly is mounted on a slide block which reciprocates between the extrusion head and the filling nozzle, the mould assembly being in two sections, the lower parts of which are slidable relatively to the block and the upper parts of which are slidably relatively to the lower parts both perpendicularly to the direction of reciprocation of the slide block. The sliding movement of the slide block and other operations of the machine may be controlled by means of limit switches.

In order to keep the top part of the length of tubing enclosed in the mould as warm and plastic as possible so that the top of the container can be successfully shaped and sealed after the container has been filled either one or both of the outer surfaces of the filling nozzle and the upper portions of the lower parts of the mould sections may be thermally insulated. For example, the lower parts of each mould section may be lined with a thermally insulating material at their upper ends, and the tip of the filling nozzle which extends down within the length of tubing into the top of the lower mould is covered with a layer of thermally insulated material, the arrangement being such that when the mandrel is introduced into the mould assembly for expanding the body of the container, part of the length of the tubing is gripped between the covering on the tip of the nozzle and the lining of the lower mould. Preferably the part of the length of tubing is gripped between a conical tip on the nozzle and a complementary conical seating at the top of the lower mould when the body of the container is blown.

Figure 2:
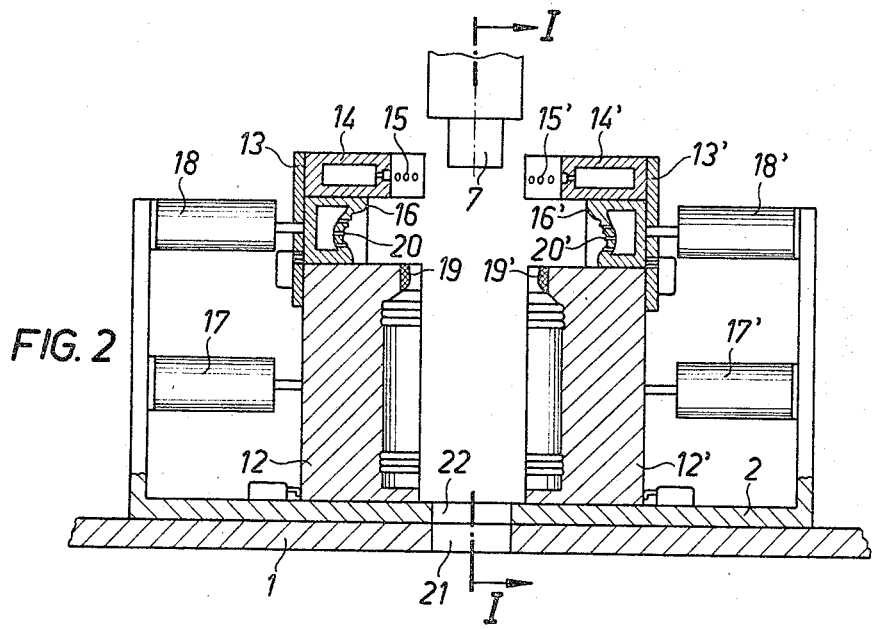

One example of a machine constructed in accordance with the invention is illustrated in the accompanying drawings, in which:

FIGURE 1 is a longitudinal section taken on the line I—I in FIGURE 2 in the direction of the arrows; and FIGURE 2 is a section taken on the line II—II in FIGURE 1 in the direction of the arrows but to a different scale.

On a table 1 a slide block 2 can be moved by means of a hydraulically or pneumatically operated piston-cylinder unit 3 from a position below an extrusion head 4 of an extruder 5 to a position below a hollow filling nozzle 6 which is secured to the table 1 and which can be raised or lowered. The extruder 5 produces a continuous length of thermoplastic tubing 7, such as polythene or polyvinylchloride and is fitted with a cutter 8 for cutting off lengths of the plastic tubing 7. The nozzle 6 is connected to a duct 9, which is in turn connected to a source of air pressure and to a filling line 10 for the supply of the material with which the container is to be filled.

The slide block 2 carries the lower parts 12 and 12' of two mould halves which are capable of sliding at right angles to the sliding direction of the piston of the piston/cylinder unit 3. Fitted to each lower mould part 12, 12' by means of a connecting piece 13, 13' is a vacuum chamber 14, 14'. The side of the vacuum chamber adjacent to the length of tubing is provided with suction nozzles 15, 15'. An upper mould part 16 capable of sliding on the lower mould half 12 and for producing the top of the container together with upper part 16' of the other mould half is located between the vacuum chamber 14 and the lower mould part 12. The lower mould part 12 is movable on the slide block 2 by means of a piston/cylinder unit 17, and the upper mould part 16 is movable on the lower mould part 12 by means of a piston/cylinder unit 18. The top inner surface of the bottom mould part 12 and the exterior of the nozzle are provided with a heat-insulating covering 19, 19′ and 19″. The upper mould defined by the parts 16, 16′ is, similarly to the vacuum chamber 14, connected to a suction source (not illustrated), by way of a duct 24 and is provided with suction nozzles 20.

The right-hand mould half shown in FIGURE 2 is identical to and marked with the same reference numerals as the left-hand half, except that to the numerals for the former are primed.

FIGURES 1 and 2 show the mould assembly positioned below the head 4 of the extruder 5. The extruder produces a piece of tubing 7, the leading end of which can just be seen. As soon as the tubing 7 has reached sufficient length, the two lower mould parts 12, 12′ move together and enclose a length of the tubing 7 between them within a lower mould. Any of the tubing protruding at the bottom is sheared off by the mould and drops down through an opening 21. When the lower mould part 12 moves, the upper mould part 16 is moved with it, however, with the upper mould closing completely. The tube piece is held at its upper end by the vacuum in the vacuum chamber 14, 14′, before it is cut off at a certain length by the cutter 8.

The partially closed mould assembly with the lower mould fully closed then moves under the filling nozzle 6 which is lowered coaxially into the length of tubing 7 within the mould until the nozzle rests on the lower mould parts 12, 12′ with the length of tubing 7 interposed between the nozzle and the lower mould. For this purpose the lining 19, 19′ has a conically shaped extension on its upper side and the end of the mandrel which is provided with a heat-insulating lining 19″ is of complementary shape. Compressed air is first injected through the duct 9 and nozzle 6 into the tubing 7 within the mould and the air cannot escape unless a certain pressure is overcome, so that at this stage the still plastic tubing 7 is expanded against the lower mould 12, 12′ and forms the body of the container. Subsequently the filling material (liquid, paste, pulverised or grannular materials etc.) is fed into the body of the already formed container through the duct 10 and nozzle 6 and the compressed air is displaced from the container. When the container is filled the nozzle 6 is lifted and the upper mold 16, 16′ then closes completely to form and seal the container neck. In order to ensure that the head part of the container is well formed, the corresponding area of the tubing which is, at this stage, still plastic is held against the upper mould parts 16, 16′ by suction. The top end of the tube is still in a plastic condition as the conduction of heat to the lower mould 12, 12′ is considerably decreased by the lining 19, 19′, 19″. Following closing of the container on completion of the neck the vacuum source is switched off and the halves of the lower mould 12, 12′ and the upper mould 16, 16′ open and then revert to their datum position. When the moulds open the filled container falls through holes 22 and 23 in the slide block 2 and table 1. The mould 12, 12′/16, 16′ again moves under the extrusion head 4 of the extruder 5 to enclose the next length of plastic tubing 7 and the operation to produce a filled and closed container begins afresh.

The movement of the upper and lower mould parts 12, 12′ and 16, 16′, the discharge of the tube 7 from the head 4 of the extruder 5, the injection of compressed air and filling of the material as well as the necessary lifting and lowering operations of the nozzle 6 are controlled by means of limit stops, time delay relays and similar switch equipment so that the process for the production of a container and subsequtnt containers is automatic.

The machine can also be used without supplying compressed air through the duct 9. In this case the tube is expanded so that it takes up the shape of the mould by the introduction under pressure of fluid with which the container is to be filled. Air trapped in the tube may escape both through the filling nozzle 6 when sufficient pressure has built up.

I claim:
1. A machine for moulding, filling and sealing containers in one operation and comprising an extrusion head adapted to extrude a length of thermoplastic tubing, at least one sectional mould assembly which is arranged to enclose said length of extruded tubing and a filling nozzle spaced from the extrusion head adapted to be introduced into the open end of said length of tubing within said mould assembly and to supply fluid under pressure to expand said length of tubing into contact with a part of said mould and form a body of said container; the sectional mould assembly being movable between the extrusion head and the filling nozzle and which comprises lower parts of said mould sections adapted to shape the body of said container, upper parts of said mould sections adapted to shape and seal the top of said container, first suction nozzles, means applying suction to said first suction nozzles, means mounting said first suction nozzles on said lower parts at a level above said upper parts of said mould sections whereby said first suction nozzles are adapted to apply suction to the outside of the upper end of said length of tubing withing said mould assembly to support said tubing during the shaping of said body of said container with said tubing out of contact with said upper parts of said mould sections, second suction nozzles carried by said upper parts of said mould sections, and means applying suction to said second suction nozzles for assisting in shaping and sealing the top of said container after said container has been filled through said filling nozzle.

2. A machine according to claim 1, wherein said mould assembly is formed in two sections and said machine further comprises a slide block mounting said mould assembly, means slidably mounting said block for reciprocatory motion between said extrusion head and said filling nozzle, means slidably mounting said lower parts of said mould sections towards and away from one another on said slide block in a direction perpendicular to the direction of reciprocation of said slide block, and means slidably mounting said upper parts of the said mould section relatively to the said lower parts also toward and away from one another in a direction perpendicular to said reciprocation of said slide block.

3. A machine according to claim 1, further comprising a tip on said filling nozzle, upper portions of said lower part of said mould sections adapted to receive said tip during expansion of said length of tubing to form said body of said container, and thermally insulating means carried by at least one of said co-operating tip and upper portions.

4. A machine according to claim 1, further comprising a tip on said filling nozzle, upper portions of said lower part of said mould sections adapted to receive said tip during expansion of said length of tubing to form said body of said container, and thermally insulating means carried by at least one of said co-operating tip and upper portions, said thermally insulating means comprising a lining to said upper portions and a covering to said tip whereby a part of said length of tubing is gripped between said lining and said covering during its formation of said body of said container.

5. A machine according to claim 3, wherein said covering on said tip is conical and said lining forms a complementary conical seating for said tip.

6. A machine for producing, filling and sealing containers from a tube of thermo-plastic material comprising a pair of relatively movable mold forms for forming a main body portion of the container including the bottom part of the container, a pair of slidable upper mold forms to form the head of the container, divided holding members for the tubing whereby the upper mold forms when the relatively movable mold forms are closed will maintain and form the head of the container, said holding members each having a chamber therein, with suction nozzles therein to hold the tube and said upper mold forms each having a chamber with suction nozzles for the head to form closing parts which during filling are spaced from the tubing and after filling are closed.

References Cited
UNITED STATES PATENTS

| | | | |
|---|---|---|---|
| 2,503,171 | 4/1950 | Power | 53—140 X |
| 2,978,745 | 4/1961 | Langecker | 18—5 X |
| 3,016,669 | 1/1962 | Grosclaude | 18—5 X |
| 3,251,915 | 5/1966 | Pechthold | 53—140 X |

J. SPENCER OVERHOLSER, *Primary Examiner.*

WILBUR L. McBAY, *Examiner.*